United States Patent
Dando

(10) Patent No.: US 6,789,367 B1
(45) Date of Patent: Sep. 14, 2004

(54) SANDWICH PANEL, INSERT THEREFOR, STRUCTURE COMPRISING SANDWICH PANELS AND METHOD OF JOINING SUCH PANELS

(75) Inventor: Glyn C. Dando, Farnborough (GB)

(73) Assignee: QinetiQ Limited (GB)

( * ) Notice: Subject to any disclaimer, the term of this patent is extended or adjusted under 35 U.S.C. 154(b) by 0 days.

(21) Appl. No.: 09/890,859

(22) PCT Filed: Feb. 8, 2000

(86) PCT No.: PCT/GB00/00361

§ 371 (c)(1),
(2), (4) Date: Aug. 14, 2001

(87) PCT Pub. No.: WO00/47903

PCT Pub. Date: Aug. 17, 2000

(30) Foreign Application Priority Data

Feb. 13, 1999 (GB) .............................. 9903161

(51) Int. Cl.[7] .................................................. E01C 5/00
(52) U.S. Cl. ..................... 52/657; 52/271; 52/783.1; 52/783.11; 52/783.17; 52/783.18
(58) Field of Search .............................. 52/747.1, 271, 52/238.1, 657, 783.1, 783.11, 783.17, 783.18, 784.14

(56) References Cited

U.S. PATENT DOCUMENTS

| | | | | |
|---|---|---|---|---|
| 2,644,553 A | * | 7/1953 | Cushman ..................... 189/36 |
| 2,849,758 A | * | 9/1958 | Plumley et al. ................. 20/15 |
| 3,529,389 A | * | 9/1970 | Wilkins ........................ 52/221 |
| 3,602,110 A | * | 8/1971 | Wiggins ........................ 94/13 |
| 3,820,295 A | | 6/1974 | Folley |
| 3,823,525 A | | 7/1974 | Brunn |
| 3,913,292 A | | 10/1975 | Braekkan |
| 3,994,105 A | | 11/1976 | Jamison et al. |
| 4,125,984 A | * | 11/1978 | Jonas .......................... 52/809 |
| 4,667,450 A | | 5/1987 | Stefnik et al. |
| 5,361,556 A | * | 11/1994 | Menchetti ..................... 52/561 |
| 5,635,306 A | * | 6/1997 | Minamida et al. .......... 428/593 |

FOREIGN PATENT DOCUMENTS

| | | |
|---|---|---|
| DE | 21 66 396 | 3/1974 |
| EP | 0 170 949 | 7/1985 |
| EP | 0 523 831 | 1/1993 |
| GB | 891929 | 3/1962 |
| GB | 2 000 465 | 1/1979 |
| GB | 2 153 408 | 8/1985 |

* cited by examiner

Primary Examiner—Carl D. Friedman
Assistant Examiner—Basil Katcheves
(74) Attorney, Agent, or Firm—McDonnell Boehnen Hulbert & Berghoff

(57) ABSTRACT

A sandwich panel including a core material sandwiched between plate members, and an insert member locally replacing the core and having a profile so as to intermesh with an appropriately profiled member on the unit to which it to be connected as well as a method of connecting sandwich panels by inserting an insert member having a profiled side so as to interlock with an appropriately profiled member on the unit to which it is to be connected.

10 Claims, 3 Drawing Sheets

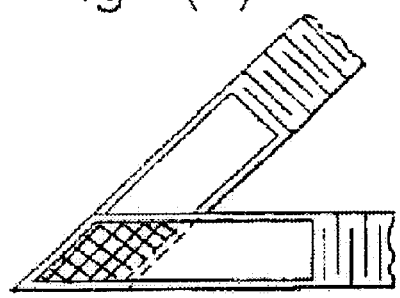
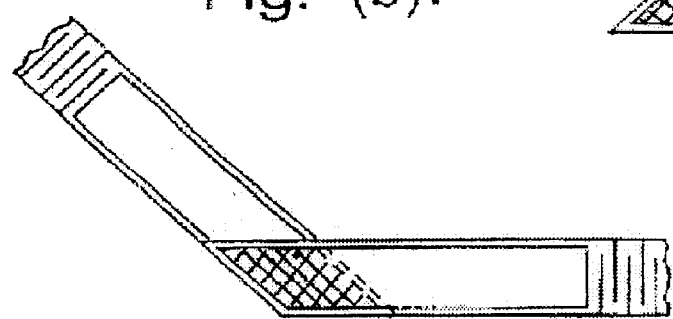
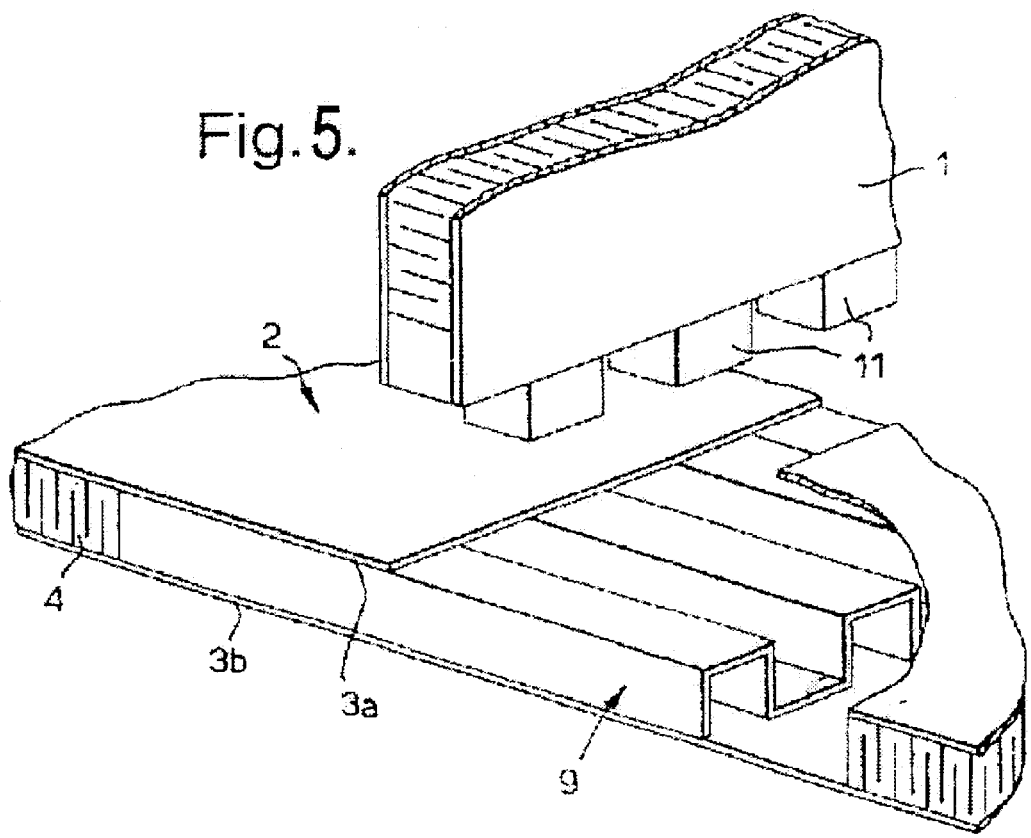

SANDWICH PANEL, INSERT THEREFOR, STRUCTURE COMPRISING SANDWICH PANELS AND METHOD OF JOINING SUCH PANELS

BACKGROUND OF THE INVENTION

1. Field of the Invention

The invention relates to methods of joining sandwich panels and to sandwich panels themselves having means to connect to other sandwich panels or structural or non structural units.

2. Discussion of Prior Art

Sandwich panels comprise a core material (such as honeycomb) sandwiched between plates of stiff material. These composite panels have application in a wide variety of areas due to significant mass savings and their high strength/stiffness to weight ratio and thus their use in lightweight structures. Thus they have application in the construction, aerospace and other fields.

It is a requirement that these panels be joined so as to form a structure and in such a way that they are able to withstand and transmit loads.

Alternative methods of joining sandwich panels have been developed. FIG. 1a shows a simple way of joining two panels at 90°. This is done by extending one of the plates of one of the panels and using adhesive to connect to the cut end of the other. This joint is however extremely weak in many modes.

Alternatively cleats are known which produce fairly strong jointing between panels. These cleats consist of shaped plates which are used in a variety of modes. FIGS. 1b and 1d show two panels joined at 90° and a "T" joint respectively. The panels of FIGS. 1b and d are joined in each case by two L-shaped cleats 7. The interfaces between the panels and the joining surface of the cleats are provided with adhesive. Alternatively the cleats may be mechanically fastened or a combination of both. In an alternative mode the cleats are shaped to provide a slot for insertion of the panels as shown at 8 in FIG. 1c. This has the advantage in providing a stronger connection. However the use of cleats is not without problems. Firstly there is the problem that cleats are additional components which add to the cost as well as the increase in time in joining and assembling sandwich panels. Cleats having slots for insertion of the panels have to be accurately sized which is problematic. Heat or cold will often complicate accurate fitting as there is frequently thermal mismatch. In addition the use of cleats does not provide smooth joining. These may reduce aerodynamic performance in particular applications as well as making it more difficult to install units internally.

An alternative method of joining sandwich panels is disclosed in DE-A-2166396. The sandwich panels are provided with recesses formed from shell connectors which are embedded within the panel at the edge of a joint between shell halves. A latching profile is provided which may either plug the recess to provide structural support at the joint and protect the recess or provide connection between two or more panels having appropriately contoured recesses.

It is an object of the invention to provide a method of joining sandwich panels which is simple, effective and provides a good joint whereby forces are transmitted across members efficiently.

SUMMARY OF THE INVENTION

The invention comprises a sandwich panel comprising a core material sandwiched between plate members, and an insert member locally replacing the core and having a profiled side so as to intermesh with an appropriately profiled member on a second sandwich panel to which it is to be connected.

The insert is preferably corrugated. It is preferably fabricated from a high strength lightweight material such as carbon fibre reinforced plastic.

The advantages are that the corrugated sections interlock on assembly providing additional surface areas for adhesive in shear. No matching of honey comb or other filler material is required. The joining gives a lightweight structure with give good compression strength, excellent distribution of forces (especially shear). The appropriate use of a potting compound is preferred.

BRIEF DESCRIPTION OF THE DRAWINGS

The invention will hereinafter be described by way of example only and with reference to the following figures of which:

FIGS. 4(a) and 4(b) show 45° and 135° angle joints using the corrugated design.

FIG. 5 shows a further embodiment of the invention whereby the insert is used in a "T" joint.

DETAILED DISCUSSION OF PREFERRED EMBODIMENTS

Figure 1A:
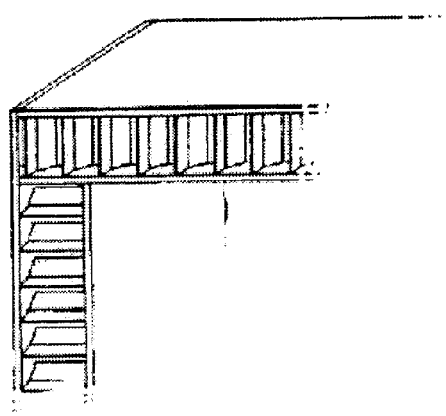
FIGS. 1(a)–1(d) show various prior art methods of joining two panels.
Figure 1B:
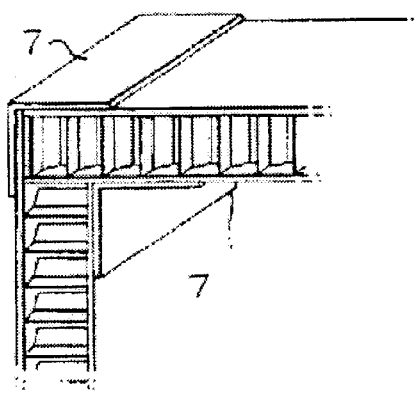
Figure 1C:
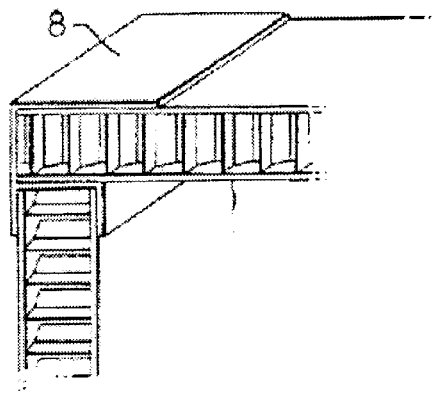
Figure 1D:
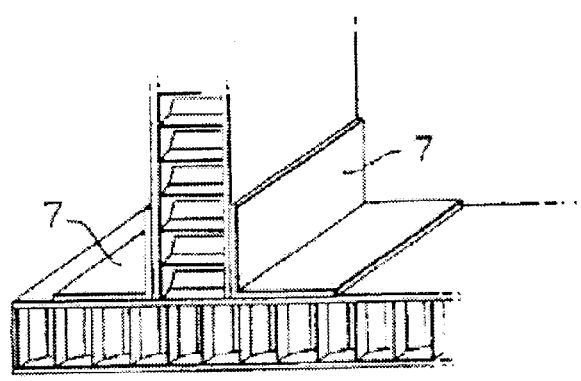
Figure 2:
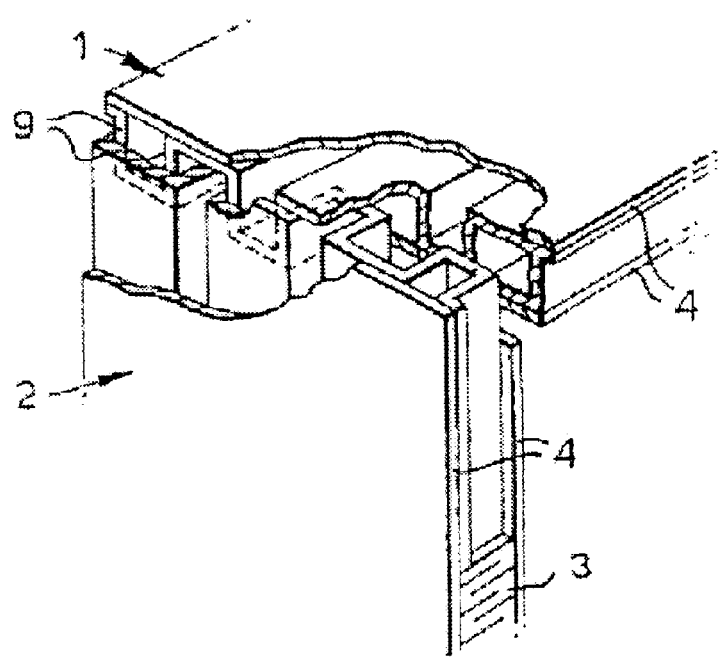
FIG. 2 shows an embodiment of the corrugated joint in accordance with the present invention.

FIG. 2 shows two honeycomb panels 1 and 2 each having a honeycomb centre 3 sandwiched between two face skin plates 4. One of the skin plates of each panel is extended such that it is greater in length than its opposite plate. The honeycomb core does not extend to the edge of the short plate but terminates a short distance from it. A corrugated member 9 is inserted between the two plates of each panel such that they extend from the honeycomb material to be flush with the longer plate. In assembly the two panels are effectively joined by pushing the panels together such that the corrugated inserts mate to produce a snug fit. Adhesive is preferably applied.

FIG. 3 shows a corrugated section bonded into a honey comb sandwich panel.

The skilled person would understand that the inserts can be of any suitable shape. The corrugations may be of a wide variety of shapes, such as square or rectangular. Moreover the inserts do not need to be corrugated.

Figure 3A:
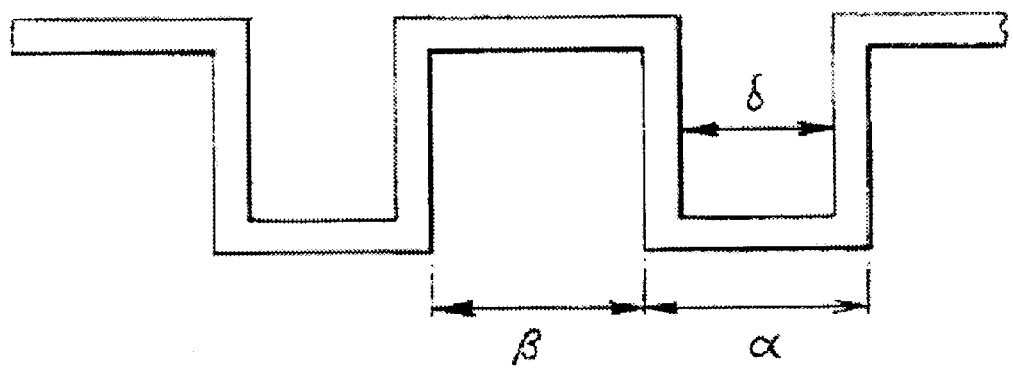
FIGS. 3(a) and 3(b) show various profiles of insert members.
Figure 3B:
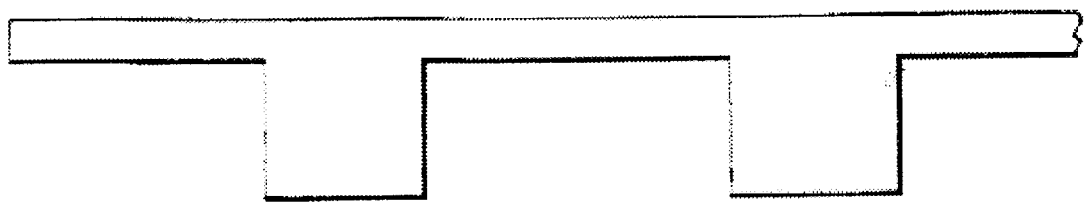

FIGS. 3(a) and 3(b) show various end profiles of inserts. FIGS. 3a, b, show a corrugated insert and a solid rectangular cut-out insert. As far as these profiles are concerned they are preferably uneven such that the distance β and α are substantially the same thus allowing a good fit of identical inserts with each other. This leads perforce to the distance δ being less than β and α and thus to "uneven" inserts. The main consideration is that they have a profile which can mate with a profile on another insert to produce a snug fit. Preferably the inserts extend between the faceskins down to the core material (honeycomb).

Preferably the inserts are corrugated as this allows for a lightweight insert with large stiffness.

To improve further the integrity of the join, adhesive is preferably used.

FIGS. 4(a) and 4(b) show two honey comb panels comprising plates and honey-comb filler, joined at 45° and 135°. Each panel angle joint comprises inserts suitably angled and profiled. The cross-hatched "area" shows the bond area which is in shear.

FIG. 5 shows a further embodiment of the invention whereby the insert is used in a "T" joint. Two sandwich panels are shown 1,2. A corrugated insert 9 is bonded between two faceskins 3a, b of the panel 2 with the inner face skin 3a removed at the location of the joint. The adjoining panel has an insert which has lugs 11 that correspond to the pitch of the corrugated section. These may be manufactured from a composite block, which is inserted between the skin plates of the panel. In this embodiment although the outer skin has been cut the forces within the skin can be transferred by the adhesive in shear through the corrugated section.

What is claimed is:

1. A structure comprising:
    a sandwich panel comprising a core material sandwiched between plate members and a profiled member located between the plate members at a selected position; and
    a unit joined to said sandwich panel comprising a second profiled member intermeshing with said profiled member of said sandwich panel;
    said intermeshing profiled members defining a plurality of pairs of closely confronting surfaces perpendicular to the planes of said plate members between which surfaces adhesive is applied to bond said profiled members together and whereby loads tending to separate said panel and unit, in a direction opposite to the relative movement by which said profiled members are intermeshed, can be transferred between said profiled members through said adhesive in shear.

2. A structure according to claim 1 wherein said unit is a second sandwich panel comprising a core material sandwiched between plate members and said second profiled member is located between the respective plate members at a selected position.

3. A structure according to claim 2, wherein, in at least one of said sandwich panels, one of the plate members is longer than the other and the respective profiled member extends so as to be substantially flush with the edge of said longer plate member.

4. A structure according to claim 1, wherein the profile of each said profiled member is corrugated.

5. A structure comprising,
    a first sandwich panel; and
    a second sandwich panel;
    each of said panels comprising a core material sandwiched between plate members and an insert member between the respective plate members, each of said insert members presenting a profile in the form of rectangular corrugations having successive crowns and troughs, the widths of said crowns and the widths of said troughs substantially equal, and said panels interconnected by intermeshing of said profiles.

6. A structure according to claim 5, wherein said profiles are bonded together by adhesive.

7. A structure comprising:
    a first sandwich panel;
    a second sandwich panel;
    each of said panels comprising a core material sandwiched between plate members and an insert member between the respective plate members, said insert members having respective profiles interengaged to positionally locate said panels relative to each other, each said profile in the form of rectangular corrugations having successive crowns and troughs, the widths of said crowns and the widths of said troughs substantially equal; and
    adhesive for adhesively bonding the insert members to each other.

8. A structure comprising:
    a sandwich panel comprising a core material sandwiched between plate members and a profiled member located between the plate members at a selected position; and
    a unit jointed to said sandwich panel comprising a second profiled member intermeshing with said profiled member of said sandwich panel,
    the profile of each said profiled member is in the form of rectangular corrugations having successive crowns and troughs, the widths of said crowns and the widths of said troughs substantially equal;
    said intermeshing profiled members defining a plurality of confronting surfaces perpendicular to the planes of said plate members between which surfaces adhesive is applied to bond said profiled members together and whereby loads in a direction tending to separate said panel and unit can be transferred between said profiled members through said adhesive in shear.

9. A method of joining a sandwich panel to another unit, the sandwich panel comprising a core material sandwiched between plate members and a first profiled member located between the plate members of said sandwich panel at a selected position;
    said unit comprising a second profiled member complementary to the first profiled member, said profiled members shaped to define a plurality of pairs of closely confronting surfaces perpendicular to the planes of said plate members when said profiled members are intermeshed; and the method comprising:
    intermeshing said profiled members by relative movement between them and with adhesive applied between said confronting surfaces whereby to bond said profiled members together and whereby loads tending to separate said panel and unit, in a direction opposite to said relative movement can be transferred between said profiled members through said adhesive in shear.

10. A method according to claim 9 wherein said other unit is a second sandwich panel comprising a core material sandwiched between plate members and said second profiled member is located between the respective plate members at a selected position.

* * * * *